United States Patent Office 2,731,846
Patented Jan. 24, 1956

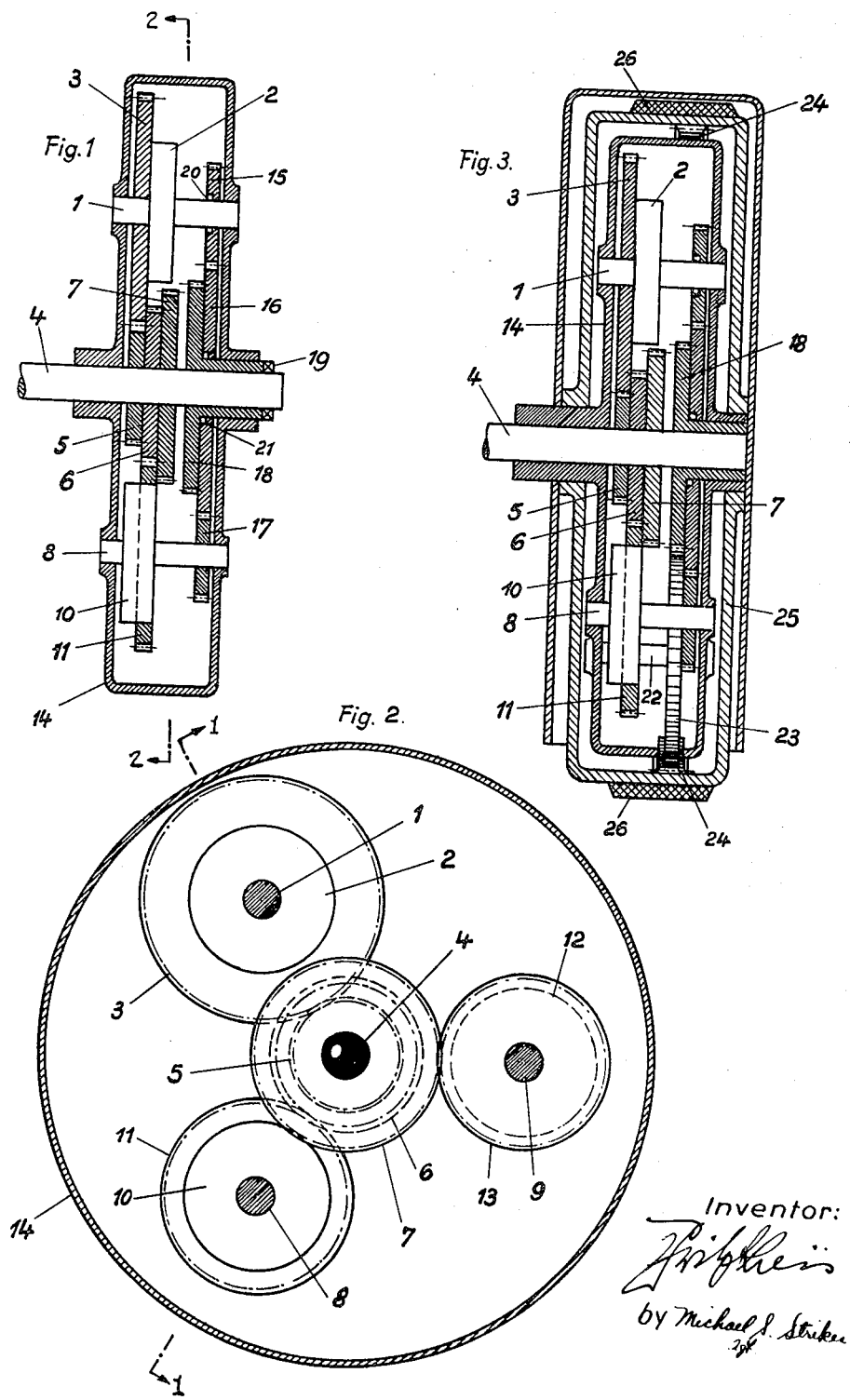

2,731,846

AUTOMATICALLY OPERATING CHANGE SPEED GEAR

Fritz Kreis, Wurzburg, Germany

Application May 7, 1951, Serial No. 224,891

4 Claims. (Cl. 74—336)

The present invention relates to automatically operating speed change gears, and more particularly to a speed change gear transmission in which the gear stages are successively engaged by the operation of centrifugal clutches.

In known speed change gear transmissions of this type, the arrangement of the centrifugal clutches is such that all centrifugal clutches are positioned along a common axis and are connected to coaxial hollow shafts which extend into each other.

This construction requires a great axial extension of the transmission, and it is therefore disadvantageous for the use with vehicles having a narrow frame.

It is one object of the present invention to provide an automatic change speed gear in which a plurality of centrifugal clutch means obtain consecutive shifting of the gear stages, and in which the centrifugal clutch means are substantially arranged in one plane.

It is another object of the present invention to provide an automatic change speed gear of very short axial extension which can be mounted on narrow vehicles.

With these objects in view, the present invention refers to an automatically operating speed change gear transmission, and comprises the following elements:

A supporting casing, a drive shaft rotatably mounted in the casing, driven means coaxially arranged with the drive shaft rotatably mounted in the supporting casing, a plurality of toothed wheels fixedly mounted on the drive shaft for common rotation, a plurality of secondary shafts rotatably mounted in the casing and extending parallel to the drive shaft, a plurality of centrifugal clutch means, each clutch means mounted on one of the secondary shafts and including a first member fixedly secured to the secondary shaft and a freely rotatable second clutch member, the first and second clutch members engaging at predetermined rotary speeds due to centrifugal force, successive clutch means of the plurality of centrifugal clutch means engaging at successively higher speeds, the clutch means on each of the secondary shafts being arranged in substantially the same plane as the clutch means on the other secondary shafts, a plurality of gears, each gear associated with the second clutch member of one of the clutch means for common rotation, and transmission means connecting each of the secondary shafts with the driven means, at least some of the transmission means including free wheel means.

A speed change gear transmission of this type is very narrow, and can therefore be used for engine driven railroad shifting dollies. When the gear transmission of the present invention is used for a railroad shifting dolly, a freely rotatable hollow wheel means mounted on the casing enveloping the same constitutes the driven means.

The novel features which are considered as characteristic for the invention are set forth in the appended claims. The invention itself will be best understood from the following description of two specific embodiments when read in connection with the accompanying drawings, in which:

Fig. 1 is an axial section through a transmission according to the present invention taken on line 1—1 in Fig. 2;

Fig. 2 is a transverse sectional view on line 2—2 in Fig. 1; and

Fig. 3 is an axial sectional view of a modified embodiment of the present invention applied to a switching dolly.

Referring now to the drawing and more particularly to Figs. 1 and 2, a speed change gear transmission is shown therein which has three gear stages. It will be apparent that a greater or smaller number of gear stages can be provided. Each gear stage includes a centrifugal clutch means, the arrangement being such that the centrifugal clutches successively engage at successively higher speeds. The centrifugal clutch 2 is associated with the secondary shaft 1. It comprises a first inner member, not shown, which is fixedly mounted on shaft 1, and a second clutch member which is freely rotatable thereon. A gear 3 is connected for rotation to the second outer clutch member of the clutch 2. In a similar manner the secondary shaft 8 is associated with a second centrifugal clutch means 10 which also includes a first inner member fixed for rotation on shaft 8, and a second outer clutch member which is freely rotatable thereon, and is fixedly connected for rotation to a gear 11. A third secondary shaft 9 shown in Fig. 2, is associated with a third centrifugal clutch means 12 which comprises a first inner member connected for rotation to shaft 9 and a second clutch member which is freely rotatable thereon. The second clutch member of centrifugal clutch 12 is fixedly connected for rotation to a gear 13. The three secondary shafts 1, 8 and 9 are mounted in a casing 14 which also supports a drive shaft 4.

Three gears are fixedly secured to the drive shaft 4, namely the gear 5 which meshes with the gear 3, the gear 6 which meshes with the gear 11, and the gear 7 which meshes with the gear 13. It will therefore be apparent that rotation of the drive shaft 4 will cause rotation of the three second clutch members of the respective centrifugal clutches. A gear 18 has a hub 18' freely rotatable on shaft 4 and provided with claws 19 which constitute a driven means which may be connected to other driven means through claw coupling cooperating with the claws 19.

Transmission means connect each of the secondary shafts 1, 8 and 9 with the driven means 18' and 19. The transmission means include a gear means 15 mounted on shaft 1 and connected thereto by a free wheel means 20, a gear 17 fixedly connected for rotation with the shaft 8, and a further gear means, not shown, meshing with the gear 18. A toothed wheel 16 meshes with gear means 15 and 17, and is connected to the hub 18' by a free wheel means 21.

When a prime mover, not shown in the drawing, rotates the drive shaft 4, the gears 5, 6 and 7 rotate with the same, and the second outer clutch members rotate freely on the associated shafts.

In the first speed stage, the clutch 2 engages so that the shaft 1 is driven through gears 5, 3 and centrifugal clutch 2. Shaft 1 drives the gear means 15 which in turn rotate the toothed wheel 16. Gear means 16 is coupled by free wheel 21 to the hub portion 18' of the gear means 18, and consequently rotates the driven means 18', 19. At the same time the secondary shaft 8 is driven by the gear means 17 which meshes with the toothed wheel 16. At first the centrifugal clutch 10, adjusted to engage at a higher speed than the centrifugal clutch 2, does not engage. When, however, the speed increases, shaft 8 rotates fast enough to cause engagement of the centrifugal clutch 10. As soon as clutch 10 engages, the driven means 18 are driven through gear 6, gear 11, clutch 10, secondary shaft 8, and gear means 17 and 16. The first gear stage becomes inactive as the free wheel means 20 disconnects the gear 15 from the secondary shaft 1.

In the third speed stage, the first inner part of clutch 12 is driven through gear means 16, free wheel 21, gear means 18, and a gear means on shaft 9, not shown, and meshing with gear 18 so that, as a higher number of revolutions is obtained, the third centrifugal clutch 12 engages, and gear means 13 and the second outer part of clutch 12 are coupled for power transmission through gear 7. In this position clutch 12 drives the coupling claws on hub 18′ through shaft 9, a gear means on shaft 9, and gear means 18. The second speed stage is overrun at the free wheel means 21.

When the speed change gear is used in a shifting railroad dolly, as shown in Fig. 3, the drive from gear means 18 is transmitted through an intermediate gear means 23, which meshes with an inner gear crown 24 fixedly secured to the inside of a freely rotatable wheel 25 which is supported on casing 14. The wheel 25 is provided on its outside with an annular cover 26 which serves as a tire.

It will be understood that each of the elements described above may also find a useful application in other types of gear transmissions differing from the types described above.

While the invention has been described as embodied in a change speed gear including a set of successively engaging centrifugal clutches arranged substantially in a plane, it is not intended to be limited to the details shown.

What is claimed as new and desired to be secured by Letters Patent is:

1. An automatically operating speed change gear, comprising in combination, a supporting casing; a drive shaft rotatably mounted in said casing; driven means coaxially arranged with said drive shaft rotatably mounted in said supporting casing; a plurality of toothed wheels fixedly mounted on said drive shaft for common rotation; a plurality of secondary shafts rotatably mounted in said casing and extending parallel to said drive shaft; a plurality of centrifugal clutch means, each clutch means mounted on one of said secondary shafts and including a first member fixedly secured to said secondary shaft and a freely rotatable second clutch member, said first and second clutch members engaging at predetermined rotary speeds due to centrifugal force, successive clutch means of said plurality of centrifugal clutch means engaging at successively higher speeds, the clutch means on each of said secondary shafts being arranged in substantially the same plane as the clutch means on the other secondary shafts; a plurality of gears, each gear associated with the second clutch member of one of said clutch means for common rotation; and transmission means connecting each of said secondary shafts with said driven means, at least some of said transmission means including free wheel means.

2. An automatically operating speed change gear, comprising in combination, a supporting casing; a drive shaft rotatably mounted in said casing; driven means coaxially arranged with said drive shaft rotatably mounted in said supporting casing; a plurality of toothed wheels fixedly mounted on said drive shaft for common rotation; a plurality of secondary shafts rotatably mounted in said casing and extending parallel to said drive shaft; a plurality of centrifugal clutch means, each clutch means mounted on one of said secondary shafts and including a first member fixedly secured to said secondary shaft and a freely rotatable second clutch member, said first and second clutch members engaging at predetermined rotary speeds due to centrifugal force, successive clutch means of said plurality of centrifugal clutch means engaging at successively higher speeds, the clutch means on each of said secondary shafts being arranged in substantially the same plane as the clutch means on the other secondary shafts; a plurality of gears, each gear fixedly secured to the second clutch member of one of said clutch means on the outer perimeter thereof; and transmission means connecting each of said secondary shafts with said driven means, at least some of said transmission means including free wheel means.

3. An automatically operating speed change gear, comprising in combination, a supporting casing; a drive shaft rotatably mounted in said casing; driven means coaxially arranged with said drive shaft rotatably mounted in said supporting casing; a plurality of toothed wheels fixedly mounted on said drive shaft for common rotation; a plurality of secondary shafts rotatably mounted in said casing and extending parallel to said drive shaft; a plurality of centrifugal clutch means, each clutch means mounted on one of said secondary shafts and including a first member fixedly secured to said secondary shaft and a freely rotatable second clutch member, said first and second clutch members engaging at predetermined rotary speeds due to centrifugal force, successive clutch means of said plurality of centrifugal clutch means engaging at successively higher speeds, the clutch means on each of said secondary shafts being arranged in substantially the same plane as the clutch means on the other secondary shafts; a plurality of gears, each gear fixedly secured to the second clutch member of one of said clutch means on the outer perimeter thereof; a plurality of gear means, each of said gear means mounted on one of said secondary shafts; free wheel means operatively connecting at least some of said secondary shafts with the gear means associated therewith; and a toothed wheel means including a free wheel means mounted on said driven means for common rotation and meshing with said plurality of gear means on said secondary shafts.

4. An automatically operating speed change gear, comprising in combination, a supporting casing; a drive shaft rotatably mounted in said casing; driven means coaxially arranged with said drive shaft rotatably mounted in said supporting casing and including gear members; a plurality of toothed wheels fixedly mounted on said drive shaft for common rotation; a plurality of secondary shafts rotatably mounted in said casing and extending parallel to said drive shaft; a plurality of centrifugal clutch means, each clutch means mounted on one of said secondary shafts and including a first member fixedly secured to said secondary shaft and a freely rotatable second clutch member, said first and second clutch members engaging at predetermined rotary speeds due to centrifugal force, successive clutch means of said plurality of centrifugal clutch means engaging at successively higher speeds, the clutch means on each of said secondary shafts being arranged in substantially the same plane as the clutch means on the other secondary shafts; a plurality of gears, each gear fixedly secured to the second clutch member of one of said clutch means on the outer perimeter thereof; a plurality of gear means, each of said gear means mounted on one of said secondary shafts; free wheel means operatively connecting at least some of said secondary shafts with the gear means associated therewith; a toothed wheel means including a free wheel means mounted on said driven means for common rotation and meshing with said plurality of gear means on said secondary shafts; a freely rotatable wheel mounted on said casing and having an inner gear; and an intermediate gear rotatably mounted in said supporting casing and meshing with said inner gear on one hand and with said gear member of said driven means on the other hand.

References Cited in the file of this patent

UNITED STATES PATENTS

| | | |
|---|---|---|
| 766,551 | Sturtevant et al. | Aug. 2, 1904 |
| 1,897,684 | Waseige | Feb. 14, 1933 |
| 2,036,133 | Goltsch | Mar. 31, 1936 |
| 2,058,736 | Stauffer et al. | Oct. 27, 1936 |
| 2,143,325 | Kreis | Jan. 10, 1939 |
| 2,155,132 | Henriod | Apr. 18, 1939 |
| 2,241,536 | Braden | May 13, 1941 |